FINGER TO PIANO KEY INDICATOR

Original Filed Aug. 31, 1951

*INVENTOR.*
LETA WALLACE
*BY*
Marvin B. Davis
ATTORNEY

United States Patent Office

Re. 24,195

Reissued Aug. 21, 1956

24,195

FINGER TO PIANO KEY INDICATOR

Leta Wallace, Kansas City, Mo., assignor of one-third to Amy Winning, Kansas City, Mo.

Original No. 2,663,211, dated December 22, 1953, Serial No. 244,509, August 31, 1951. Application for reissue July 21, 1954, Serial No. 444,935

5 Claims. (Cl. 84—478)

Matter enclosed in heavy brackets [ ] appears in the original patent but forms no part of this reissue specification; matter printed in italics indicates the additions made by reissue.

This invention relates to an improvement in a finger to piano key indicator guide [with reference indicia to be used for all general scales] *for assisting students of music generally, and piano students particularly, in learning scales, scale fingering, keyboard harmony and the like.*

*It is the object of my invention, broadly speaking, to provide a visual aid which, apart from facilitating the study of scale theory and analysis, will greatly assist the student—even the very young student—in rapidly acquiring technical skill and speed in the correct playing and fingering of all commonly used piano scales, both major and harmonic minor.*

*The time-honored medium for introducing a piano student to the playing of scales is, of course, a music practice book on whose staffs are printed ascending and descending series of notes. Translating the printed staff notations into correct keyboard and finger manipulation requires a degree of sustained concentration too often lacking in the young student, resulting in early formation of incorrect playing habits. Or, if error is avoided through painfully intent concentration on the selection of the proper piano key and the proper finger for each note, the playing is often so slow and faltering that the scale pattern as a musical entity has great difficulty emerging from the forest of disembodied notes, keys and fingers in which the student finds himself. In either case the practice of scales may soon become a distasteful and relatively meaningless ordeal, alienating the student almost more than it helps him.*

*It is an important object of my invention to avoid these difficulties by making it possible for the pupil to learn the keyboard "pattern" of any desired scale without dependence upon, or reference to, conventional musical staff notation—and to do this quickly and easily, so that the keyboard pattern of the scale is clearly fixed in the student's mind at the outset, even before he is required to learn the letter names of the notes he is playing. With this approach, the pupil plays the right keys with the right fingers and hears the right tones from the very start, making for early understanding and recognition of the scale as an entity, and correspondingly reducing the opportunity for errors and formation of faulty habits. Practice of each scale by rote fixes it empirically in the student's mind while bringing manual facility and speed; and as he progresses to new scales, the relationship of the new scale to the old in terms of keyboard pattern quickly takes concrete shape; that is to say, because the student always sees the scale pattern as a whole, the different scales have coherence and integration with one another. The pupil comprehends more readily the reason for the sharps and flats in the signatures, and the matter of correlating keyboard play with staff notation then follows logically and easily.*

*In thus giving the student a working knowledge of scale technique as a foundation for teaching him scale theory and music notation, it will be seen that I first teach the thing itself and then the substance of the thing, just as in elementary schools the primary pupil learns objects and actions and their nature prior to learning how to spell the names of such objects and actions or even the letters that makes up such names. The psychological soundness of this approach in pedagogy is now very conclusively developed and proven.*

[Heretofore, several slide rule indicators have been on record for teaching chords and the fingering thereof and at least one illustrates a single slide for fingering for the left hand and right hand with the fingering unevenly spaced on the slide.]

[The present improved invention is the provision of a guide that is inserted between the black keys of the piano and the piano case having a series of guide arrow heads spaced thereon for a general scale, a key-note indicator to indicate the selected key to be played and for the positioning of the guide for each arrow head pointing to the respective key of the keynote scale.]

*The present invention involves the provision of a scale guide that is inserted between the black keys of the piano and the piano case, having a series of arrowheads spaced thereon at such intervals that regardless of the position of the guide, the arrows will point to the proper keys for playing some scale, either major or harmonic minor; and for positioning the guide for use in playing a given scale, I provide thereon a keynote indicator adapted to be positioned in register with the piano key corresponding to the tonic or keynote of the selected scale.*

[Another object of the improved guide is the addition of a slide or slides being on the guide and having uniform fingering indicia to register with the nearest arrow heads pointing to the keys of a piano whether they be black or white and the arrows being properly spaced for a scale of the selected key-note, whether the keys be black or white, a window on the guide, and a plurality of groups of key indicia spaced on the slide, each registering with the window of the guide for the selected key-note arrow when placed or pointed toward the piano key.]

*Another feature of my improved scale guide resides in the provision of a slide or slides supported on the guide for limited lateral movement relative to the aforementioned arrowheads and having uniformly spaced fingering indicia to register with different arrowheads at different times, depending on the position of the slides; for positioning the slides, I provide a window on the guide and a plurality of groups of key indicia spaced on the slide, each registering with the window of the guide for the selected keynote of the scale to be played.*

[Another object of the present invention is to provide a guide with a row of arrow heads spaced thereon for a general scale, one row of arrows for a major scale and another row for a harmonic minor scale, in either case the arrow heads pointing to the respective piano keys of a scale, a key-note indicator to indicate the scale key to be played and position the guide for each arrow head pointing to the respective key of the key-note scale. The major general scale arrow heads are spaced as follows according to the keys of the piano, beginning from the left one key space, one key space, one half space, one space, one space, one space, one half space, one space, one space, one half space, one space, one space, one space and one half space, making preferably a two octave scale. In the harmonic minor general scale the arrows spaced beginning at the left, one space, one half space, one space, one space, one half space, one and one half spaces, one half space, one space, one half space, one space, one space, one half space, one and one half spaces, and one half space, making preferably a two octave scale for the harmonic minor general scale. Placing this guide with either general scale thereon directly on the piano it will be found that the preferable key-note middle arrow points to the selected key whether it be white or black and all of the other arrows point to their respective keys for the selected scale.]

*A further feature of the invention resides in the provision of a slide rule type of finger to piano key indicator guide of the character mentioned, having thereon two separate rows of arrow heads, the arrows in the first row being spaced at non-uniform intervals coinciding with the spacing of the piano keys to be played in any major scale, and the arrows in the second row being spaced at different non-uniform intervals coinciding with the spacing of the piano keys to be played in any harmonic minor scale; another feature resides in the provision of means permitting the slides which bear the fingering indicia to be used interchangeably with either row of arrows.*

[Another object of the present invention is to provide a guide member with indicia for the keys of a piano, a slide member having means to hold the slide to the guide member, a plurality of scale finger indicia all being equally spaced on the slide member, a plurality of key scale indicia being spaced on the slide member, means to register the scale indicia and the finger indicia with the indicia for the keys of a piano for a selected scale, and a register point in said guide for the first key of the selected scale.]

*In connection with a finger to piano key indicator guide of the character referred to (that is to say, one having non-uniformly spaced key indicator arrows on the scale guide and uniformly spaced fingering indicia on the slides) still another feature of my invention resides in the provision of novel means for facilitating visual association of the fingering indicia with proper key indicator arrows, particularly in those cases where there is lack of precise registry between the two.*

With [these objects in view] *the foregoing objects and features in mind,* the invention may be more fully understood from the accompanying drawing, the following specification and the scope of the appended claims.

Figure 1:
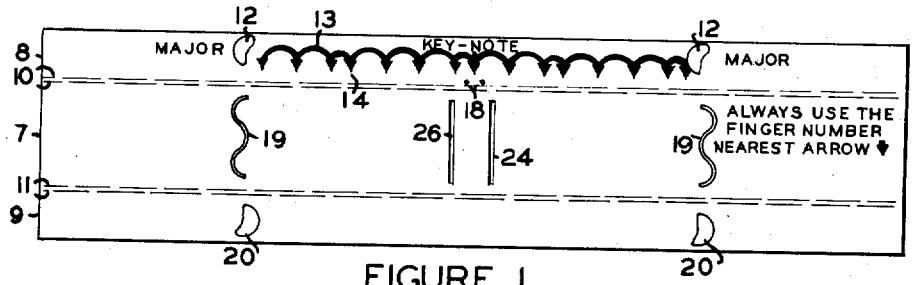
Figure 1 is a flat view of the unfolded *slide holder and scale* guide member [with the major general scale arrow spacing thereon] *showing the spacing and arrangement of the key indicator arrows used in playing major scales.*

[The unfolded guide member as illustrated in Figure 1 is made from a rectangular flat member 7 having narrow portions 8 and 9 and longitudinal fold lines 10 and 11, the narrow portion 8 is provided with a pair of windows 12 and preferably a continuous arrow 13 having a multiple or plurality of heads or arrow points 14. The number of arrow heads 14 are preferably illustrated for two full scales and point directly to the keys of a piano when the folds 10 of the guide members 7 with narrow portion 8 are inserted between the black keys 15 and the piano case 16, the guide 7 or folds 10 resting upon the white keys 17. Only one white and one black key is illustrated, but it is well-known that the piano has a plurality of black and white keys.]

[Preferably the middle arrow 14 is designated as the key note and has further identification by two dots 18 below the arrow point for alignment with the piano key. The narrow portion 8 has the word major near each window 12 therein and is used for any key in the major scale.]

[The standard key board and scales of a piano are well known and are well illustrated in many references of prior patents and it is not deemed necessary to repeat the scales or keys in this patent application.]

[From a careful study of the arrow heads 14 the major scale spacing beginning from the left from the first arrow head to the second arrow head is the spacing from center to center of two white keys on a piano. Therefore to designate the keys for a general scale as illustrated the spacing between the arrows beginning at the left are: one space, one space, one half space, one space, one space, one space, one half space to the key-note or center note designating one complete octave. To the right of the key-note is another octave of spaced arrow heads like the preceding described octave of arrow heads.]

[The slots 19 and guide member 7 are preferably curved to include the register with the farthest end curved of the windows 12 and 20 and are provided for reception and exposure of the slide members 21 and 22, the left hand end of the slide 21 is inserted in the left hand slot 19 and the right hand end 23 of the slide member 21 is inserted in the lower portion of slot 24. The right hand end of the slide member 22 is inserted in the right hand slot 19, and the left hand end 25 of the slide member 22 is inserted in the upper portion of the vertical slot 26.]

Figure 6:
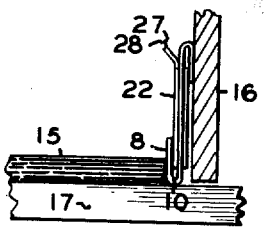
Figure 6 is aslightly enlarged fragmentary *end* view [illustrating one end] of the guide and [slides] *slide assembly, showing same* inserted on top of the white keys of the piano and between the rear of the black keys and the piano case.

[It is obvious from Figures 1 and 6 that the narrow portion 8 folds back against guide member 7 and the narrow portion 9 folds forward against the guide member 7. The narrow portion 8 is used with the slides 21 and 22 on the far side of Figure 1 for the major general scale and the narrow portion 9 is used with the slides 21 and 22 on the near side of Figure 1 for the minor scales, the slide being manually interchangeable for the two sides of the guide member 7.]

[The left hand slide 21 has a plurality of spaced group indicia thereon for registering with the left hand window 12 on the major scale or window 20 on the harmonic minor scale. The right hand slide 22 has a plurality of spaced group key indicia thereon for registering with the right hand window 12 or 20. The key indicia group spacing on the slides is spaced the same as the finger spacing indicated by the numerals thereon except preferably offset or staggered to register with the windows 12 and 20.]

Figure 5:
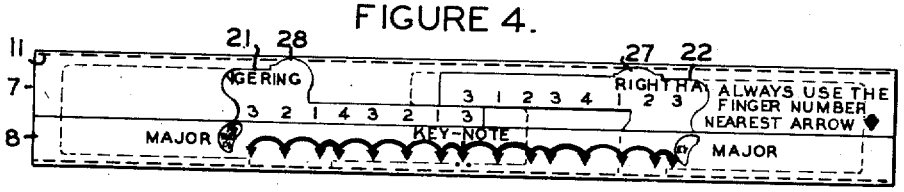
Figure 5 illustrates the [assembled] *manner in which the* guide and slide members [for the] *are assembled for use in playing a* major scale.

[Figure 5 illustrates the assembled guide and slides with the narrow portion 8 exposed for the major general scale. Each slide has been manually moved by tabs 27 and 28 until E flat is exposed in each window 12. Now it is obvious that the finger indicia or reference numerals are evenly spaced throughout the spacing of arrow heads and the numeral nearest the arrow head is the correct one to use. Any other key may be selected in the same manner. The major scale indicia for the scale is made in capital letters and the minor scale indicia is made in small or lower case letters.]

[Assume that the key of C scale is to be played. Place the key-note arrow directly over the exposed white portion of the key C near the piano case and all arrows will point to the white keys. The pair of arrows on each half space will point to the two white keys between the black keys for instance B and C or E and F. Now select the illustrated E flat scale. Place the key-note on the black key E flat, the next arrow points to white key F, next arrow to white key G, next arrow to black key A flat, next arrow to black key B flat, next arrow to white key C, the next arrow points to white key D, and the next or octave key points to black key E flat. Any of the other scale keys will work in a similar way for the correct keys.]

Figure 2:
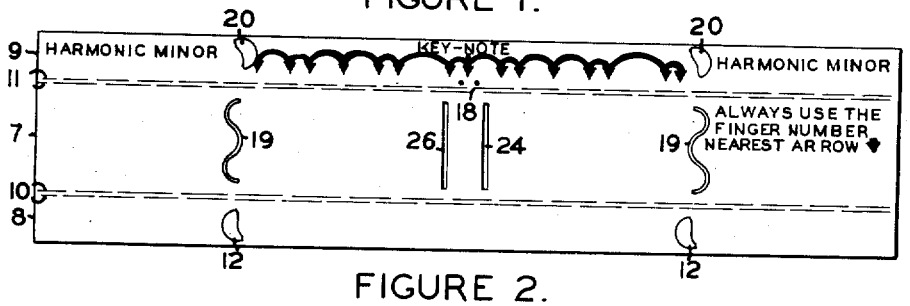
Figure 2 is a view of the reverse side of Figure 1 [indicating the general harmonic minor scale arrow head spacing] *showing the spacing and arrangement of the key indicator arrows employed in playing harmonic minor scales.*

*Referring more particularly to Figures 1 and 2, the unfolded scale guide shown therein comprises an elongate, rectangular member made from any suitable sheet material. As will be explained hereinafter, the member is adapted to be folded along the longitudinal lines 10 and 11, and in its final form serves as a holder for the slides shown in Figures 3 and 4; before considering the folding, however, let it be noted that the lines 10 and 11 divide the flat member into three panels 7, 8 and 9, the central panel 7 being approximately double the width of the outer panels 8 and 9.*

*On one face of this member, the marginal panel 8 has imprinted thereon, as shown in Figure 1, a series of arrowheads 14 all pointing toward the fold line 10. On the opposite face of the member (see Figure 2), the other marginal panel 9 has a similar series of arrowheads imprinted thereon, all pointing toward the fold line 11. Adjacent arrowheads in each series are connected by a curved or arched line 13, these being segments of a continuous (but irregular) imprinted line extending generally parallel to the longitudinal edge of the rectangular member.*

*The arrows 14 in each series are non-uniformly spaced in a manner which will be dealt with more fully hereinafter. Suffice it to say at this point that those shown in Figure 1 are used by the student in playing major scales, so preferably are identified by the word "major" imprinted beside them on the panel 8; those printed on the opposite face of the rectangular member (Figure 2) are used in playing harmonic minor scales, so are identified by the words "Harmonic Minor" printed beside them on the panel 9, as shown.*

*Between the fold lines 10 and 11, the central panel 7 has a pair of straight transverse slots 24 and 26 positioned approximately midway between the ends of the panel. Nearer its ends, panel 7 has a pair of slots 19 which conveniently can be curved or undulating as shown. Approximately in line with the latter slots the marginal panel 8 has a pair of generally crescent-shaped windows 12 punched out thereof, while the marginal panel 9 has a corresponding pair of windows 20.*

*In assembling my device, the upper marginal portion 8, as seen in Figure 1, is folded rearwardly along the longitudinal line 10 and turned downwardly to lie against the rear face of panel 7; the lower marginal portion 9 is folded forwardly along the longitudinal line 11 and turned upwardly to lie against the forward face of panel 7, forming a holder which is generally S-shaped when one looks at it from the end. To describe the same operation with reference to Figure 2, the upper marginal portion 9 is folded rearwardly along the line 11, and the lower marginal portion 8 is folded forwardly along the line 10 so that these parts now assume the position shown in Figures 5 and 6 wherein the fold line 10 is at the bottom of the unit and the fold line 11 is at the top.*

Figure 3:
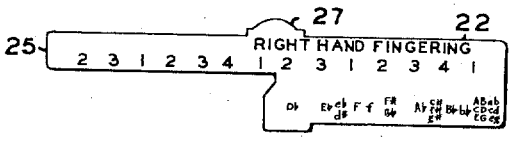
Figure 3 is a view of a right hand fingering indicia slide member.
Figure 4:
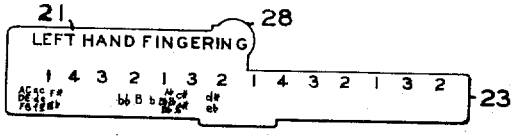
Figure 4 is a view of a left hand fingering indicia slide member.

*As illustrated in Figures 5 and 6, the upturned panel 8 forms with the wide central panel 7 a longitudinal trough on the front of my scale indicator and into this trough can be inserted the fingering indicia slides shown in Figures 3 and 4. The slide of Figure 4 preferably is inserted first with its narrow right-hand portion 23 extending through the lower half of the vertical slot 24 and its wide left-hand portion 21 extending through the left-hand undulating slot 19 as shown; the right-hand fingering slide of Figure 3 then can be inserted with its narrow left-hand portion extending through the upper half of vertical slot 26, and its wide right-hand portion 22 extending through the right-hand undulating slot 19. The narrow portions of the two slides now are staggered vertically and overlap near the central portion of the assembly, and the lower portions of both slides are received in the aforementioned trough. The slides are movable longitudinally in the folded slide holder or scale guide, and upstanding tabs 27 and 28 are provided to facilitate this. These tabs, as well as the tabs extending downwardly from the lower margin of the respective slides, cannot pass through the slots 19, 24 and 26, so serve as stops limiting the movement of the slides. On the lower portions of the respective slides are imprinted the scale indicia which will appear through the windows 12 in panel 8 as the slides are moved longitudinally of the trough by means of the tabs 27 and 28.*

*This, it will be understood, is the manner in which my device is assembled for playing major scales. To reassemble it for playing harmonic minor scales, the slides are merely removed from the slots and member 7 is inverted to make fold line 11 the bottom and fold line 10 the top of the unit. The slides then are inserted in the trough formed between the upturned lip 9 and the main panel 7 with the slides going through the same slots as before. Now, however, the scale indicia on the slides appear through the windows 20 and the words "Harmonic Minor" rather than "Major" appears on what would be considered the front of the assembly.*

*When my device is to be used for playing any major scale, it is assembled as shown in Figure 5 and is inserted in the space between the rear of the black keys 15 of the piano keyboard and the front of the piano case 16 (see Figure 6) so that it rests on the white keys 17. So positioned, it will not interfere with the playing of any key, and the inactive keys (i. e., those not depressed) will always serve to hold it erect as illustrated. Also, it is to be noted that the arrowheads 14 printed on the upturned lip 8 register with different keys along the keyboard in the sense that each arrow points directly to the rear portion of some key.*

*It will be convenient at this point to consider the spacing of the arrowheads for the major scales, as shown in Figure 5. The matter can perhaps be best approached by observing first that, at the back of the piano keyboard where my device is located in use, the width of all keys, both black and white, is substantially the same. Just as the spacing of the keys (measured from center to center near the back of the keyboard) thus is uniform, so also is the interval between the tones produced by adjacent ones of these keys uniform everywhere along the keyboard, stemming from the fact that the piano is tuned to what is known as the tempered scale.*

*In the space of one keyboard octave (for example, from the left-hand edge of one C key to the left-hand edge of the next higher C key) there are a total of twelve keys counting both black and white. However, in playing any one-octave scale, the player strikes only seven of these twelve keys plus the first key of the next keyboard octave.*

*To illustrate, consider the C major scale which is run on the white keys alone. Counting black as well as white keys, the player strikes keys 1, 3, 5, 6, 8, 10, 12 and 13—the thirteenth key actually being the first key of the second keyboard octave. Since, as has been pointed out, the tonal interval between any key and the next key higher is everywhere the same, a major scale may be built up using any key as fundamental, arbitrarily calling that key "No. 1" and striking the keys numbered 1, 3, 5, 6, 8, 10, 12 and 13, counting from that point. This, then, is the basis upon which I arrive at the spacing of the arrows 14 shown in Figures 1 and 5. When the leftmost arrow is positioned to point to the center of the rear portion of any key, this key becomes the fundamental, or key No. 1, and the succeeding arrows point, respectively to keys 3, 5, 6, 8, 10, 12 etc.*

*Stated differently, remembering that a keyboard octave comprises a total of twelve keys which are of equal width at the rear of the keyboard, and that the spacing of adjacent keys from center to center therefore is 1/12 octave, the* major scale arrows shown in Figures 1 and 5 are spaced at the following intervals, reading from left to right:

1/6 keyboard octave between first arrow and second,
1/6 keyboard octave between second arrow and third,
1/12 keyboard octave between third arrow and fourth,
1/6 keyboard octave between fourth arrow and fifth,
1/6 keyboard octave between fifth arrow and sixth,
1/6 keyboard octave between sixth arrow and seventh,
1/12 keyboard octave between seventh arrow and eighth,
1/6 keyboard octave between eighth arrow and ninth,
1/6 keyboard octave between ninth arrow and tenth,
1/12 keyboard octave between tenth arrow and eleventh,
1/6 keyboard octave between eleventh arrow and twelfth,
1/6 keyboard octave between twelfth arrow and thirteenth,
1/6 keyboard octave between thirteenth arrow and fourteenth,
1/12 keyboard octave between fourteenth arrow and fifteenth.

Thus, between the first and last arrows there is a total distance of two keyboard octaves, and it will be observed the space between adjacent arrows always is an integral multiple of 1/12 octave. The spacing of the arrows for harmonic minor scales, as shown in Figure 2, is arrived at similarly, but is specifically different from that just described. Here, again, there is a distance of two keyboard octaves between the first and last arrows, which distance is divided into the following intervals, reading from left to right:

1/6 keyboard octave between first arrow and second,
1/12 keyboard octave between second arrow and third,
1/6 keyboard octave between third arrow and fourth,
1/6 keyboard octave between fourth arrow and fifth,
1/12 keyboard octave between fifth arrow and sixth,
1/4 keyboard octave between sixth arrow and seventh,
1/12 keyboard octave between seventh arrow and eighth,
1/6 keyboard octave between eighth arrow and ninth,
1/12 keyboard octave between ninth arrow and tenth,
1/6 keyboard octave between tenth arrow and eleventh,
1/6 keyboard octave between eleventh arrow and twelfth,
1/12 keyboard octave between twelfth arrow and thirteenth,
1/4 keyboard octave between thirteenth arrow and fourteenth,
1/12 keyboard octave between fourteenth arrow and fifteenth.

From the foregoing explanation it will be clear that when my device is positioned on the keyboard with the marginal panel 8 facing the student as shown in Figure 6, the arrows 14 which appear thereon will always point to the rear portions of the proper keys to be played for some major scale. Similarly, if the device is reversed so that the marginal portion 9 faces the student, the arrows appearing thereon always will point to the proper keys to be struck in playing some harmonic minor scale.

In either case, the center arrow, as well as the extreme left-hand and right-hand arrows, point to piano key corresponding to the tonic or key note of the scale in question. My device can be shifted longitudinally to bring the latter arrows into register with any desired key note, and to assist the student in properly positioning it for playing of a desired scale, I prefer to designate the center arrow as the "key note" arrow. Associated with this I provide two dots 18 which are printed on the device in a position to straddle the selected key note of the piano keyboard, thus assisting the student in properly centering the key note arrow on the rear portion of the desired key.

Let us now consider briefly the fingering indicia which appears on the slides of my device. On the right-hand fingering slide shown in Figure 3, I print a series of numbers (1, 2, 3, 4, 1, 2, 3, etc.) in a horizontal row, these indicating the fingers to be used in sequence in playing the scale. A corresponding series of numbers (4, 3, 2, 1, 3, 2, 1, etc.) are printed in a horizontal row on the left-hand fingering guide shown in Figure 4. In each case, the horizontal space between successive numbers is equal to 1/7 of a keyboard octave, it being remembered that seven keys per octave are struck in playing any scale. When the fingering slides are assembled in my device as shown in Figure 5, the proper position of the slides for playing a given scale is established by the appearance of the key note indicia corresponding to that scale in the windows 12 or 20. These indicia are printed on the lower portions of the slides at proper intervals, and to facilitate differentiation between the indicia for major scales and the indicia for harmonic minor scales, I prefer to print the former in capital letters and the latter in lower case letters.

The manner in which my device is used will be fairly evident from the foregoing description. To play the scale of E flat major, for example, the two slides are adjusted manually by means of tabs 27 and 28 until the "E flat" legend appears in each of the windows 12, as illustrated in Figure 5. Then, with the device inserted behind the black keys of the piano, as shown in Figure 6, slide holder is shifted bodily along the piano keys 16 in order to bring the center or "keynote" arrow 14 into register with the E flat key on the keyboard, the two dots 18 being positioned straddling this key.

So positioned, the successive arrows 14 point to the proper keys for playing the E flat scale, namely (beginning from the left) E flat, F, G, A flat, B flat, C, D, E flat, F, G, A flat, B flat, C, D, and E flat. The proper finger to be used in playing each key is indicated by the number above the arrowhead pointing to that key, the number "1" indicating the thumb, the number "2" indicating the index finger, etc., in conformity with conventional fingering notation in piano music. The finger numbers appearing on the left-hand slide are, of course, those to be used by the student in playing the scale with his left hand; those appearing on the right-hand slide represent the right-hand fingering.

Referring to Figure 5, it will be observed that in some cases the finger number indicia is in direct vertical alignment with the corresponding arrowhead, while in other cases the finger number indicia is offset slightly to the left or right—a circumstance which results from the fact that the fingering indicia are spaced at uniform horizontal intervals of 1/7 octave, while the arrowheads are spaced at non-uniform intervals, some being 1/6 octave apart and others being 1/12 octave apart. Despite the lack of precise registry which thus exists in the case of some finger numbers and the corresponding arrowheads, the student has no difficulty in correlating a given finger number with the arrowhead most nearly in vertical alignment therewith. The arched lines connecting successive arrowheads assist in this, in that they form a "valley" over each arrowhead into which the proper finger number can be imagined to fall if all of the numbers were allowed to drop freely from the positions in which they are shown. This is, in other words, a form of visual aid which, by guiding the student's eyes from finger number to arrowhead, assists in correlating each finger number with the arrowhead to which the number applies.

Such is not, however, the only purpose served by the curved lines between the arowheads. When my device is in position on the piano keyboard, they form arches visually connecting the rear portions of the keys to be struck in playing a given scale and bridging over the keys which are to be skipped, so that the student's eye moves smoothly in a guided path from each key as it is played to the next one to be played, producing a high order of continuity between the movements involved in playing successive notes of the scale. Stated differently, the curved lines connecting the arrows serve to "tie together" the seven notes to be played in each keyboard octave so that they form a visually integrated unit which stands out separate and distinct from the keys which are bridged over by the arched lines and thus omitted from the unit.

It is exceedingly important that this visual integration or "tying together" of the proper keys of the scale is

*directly at the keyboard of the piano, making it unnecessary for the student to lift his eyes from the keyboard to a music score some distance above; neither is any mental process required of the student beyond merely "following the arrows"—a distinctly simpler operation than that involved in translating a musical score into terms of keys to be played. His eye movements are reduced to very small spacial displacements, for he can see at the same time the position of his fingers, the position of the keys to be played and the numbers identifying the fingers to be used in playing the keys. There is, in other words, no problem of refocusing the eyes as they travel back and forth between music rack and keyboard, nor is the student required to carry in his mind the information which otherwise would be required in order to bridge the transition intervals occurring in the course of movements of the eyes from music rack to keyboard and vice versa. Thus, both visual and mental fatigue are reduced to a minimum, which not only contributes vastly to the student's speed and accuracy but, more importantly, has a psychologically beneficial effect upon the student's attitude toward scale practice.*

*From the foregoing it will be seen that my invention is one well adapted to attain all the ends and objects hereinbefore set forth, as well as other advantages which are obvious and which are inherent to the device.*

*Because my device places directly at the keyboard everything which the student needs in order to guide his selection of the keys and his choice of fingers to operate the keys, it is found in practice that even very young and immature students using the device play scales quickly, easily and correctly from the start—and with actual enjoyment instead of exhibiting the resistance to scale study that has been so commonly encountered in the past. The student in each instance plays the scale correctly and hears it correctly with the first attempt so that its sound pattern, as well as the keyboard pattern, is immediately established in his mind. As my device is shifted up or down the keyboard in the course of selecting scales having different keynotes, the pattern remains fixed and coherent even though the keys played and the fingering used is different. The pupil can comprehend much more readily the reasons for these differences, since he always sees the scale pattern as a whole, and with this foundation the reasons for sharps and flats in the signatures as well as the matter of correlating keyboard play with staff notation can be approached and assimilated without difficulty.*

What I claim as new and desire to secure by Letters Patent is:

1. An indicator for correct fingering of a piano comprising an S-shaped holder, a slide of flat material having a right hand portion narrower than a left hand portion and having indications thereon for left hand fingering fitted into one portion of said S-shaped holder, a second slide of flat material having a right hand portion wider than the left hand portion and having indications thereon for the right hand fingering, said second slide being fitted into another portion of said S-shaped holder parallel to said first slide.

2. An indicator such as claimed in claim 1 in which the wider section of said first slide extends upward and in which the wider portion of said second slide extends downward, whereby, as the slide is operated, the narrow portions of the slides will assume complementary positions, one above the other.

*3. A slide rule of the character described, comprising a horizontally elongated holder, said holder being of flat material and having slots therein, a horizontally elongated left-hand slide, a horizontally elongated right-hand slide, both slides being received in the slots of said holder for independent horizontal movement relative to the holder, said slides having complementary narrow portions positioned one above the other and extending through the slotted holder approximately midway between its ends, said slides having wider portions spaced outwardly from said narrow portions and extending through the slotted holder nearer the ends thereof, said holder having a marginal flap folded in from one longitudinal edge thereof to cover portions of both slides, each slide having exposed thereon, in juxtaposition to said flap, a series of indicia spaced at intervals in a horizontal row, and said flap having exposed thereon a series of indicia also spaced at intervals in a horizontal row.*

*4. A slide rule as in claim 3 wherein said last series of indicia comprise non-uniformly spaced marks, each adjacent pair of marks being connected by an upwardly arched curved line.*

*5. A slide rule as in claim 3, wherein each of said slides has thereon stop means coacting with the slots in said holder for limiting the horizontal movement of said slide.*

References Cited in the file of this patent or the original patent

UNITED STATES PATENTS

| | | |
|---|---|---|
| 395,067 | Maggs | Dec. 25, 1888 |
| 680,411 | Dockery | Aug. 13, 1901 |
| 741,017 | Curtiss | Oct. 13, 1903 |
| 748,555 | Ferguson | Dec. 29, 1903 |
| 877,259 | Thrash | Jan. 21, 1908 |
| 998,612 | Hadaway et al. | July 25, 1911 |
| 1,091,598 | Somers | Mar. 31, 1914 |
| 1,177,002 | Wolfe | Mar. 28, 1916 |
| 2,188,098 | Bostelmann, Jr. | Jan. 23, 1940 |
| 2,322,465 | Mihailoff | June 22, 1943 |
| 2,632,963 | Drury | Mar. 31, 1953 |

FOREIGN PATENTS

| | | |
|---|---|---|
| 14,832 | Great Britain | June 27, 1907 |
| 23,225 | Great Britain | Oct. 14, 1913 |
| 74,050 | Austria | Dec. 10, 1917 |
| 475,314 | Germany | Apr. 24, 1929 |
| 294,370 | Switzerland | Jan. 16, 1954 |